United States Patent Office 3,383,675
Patented May 14, 1968

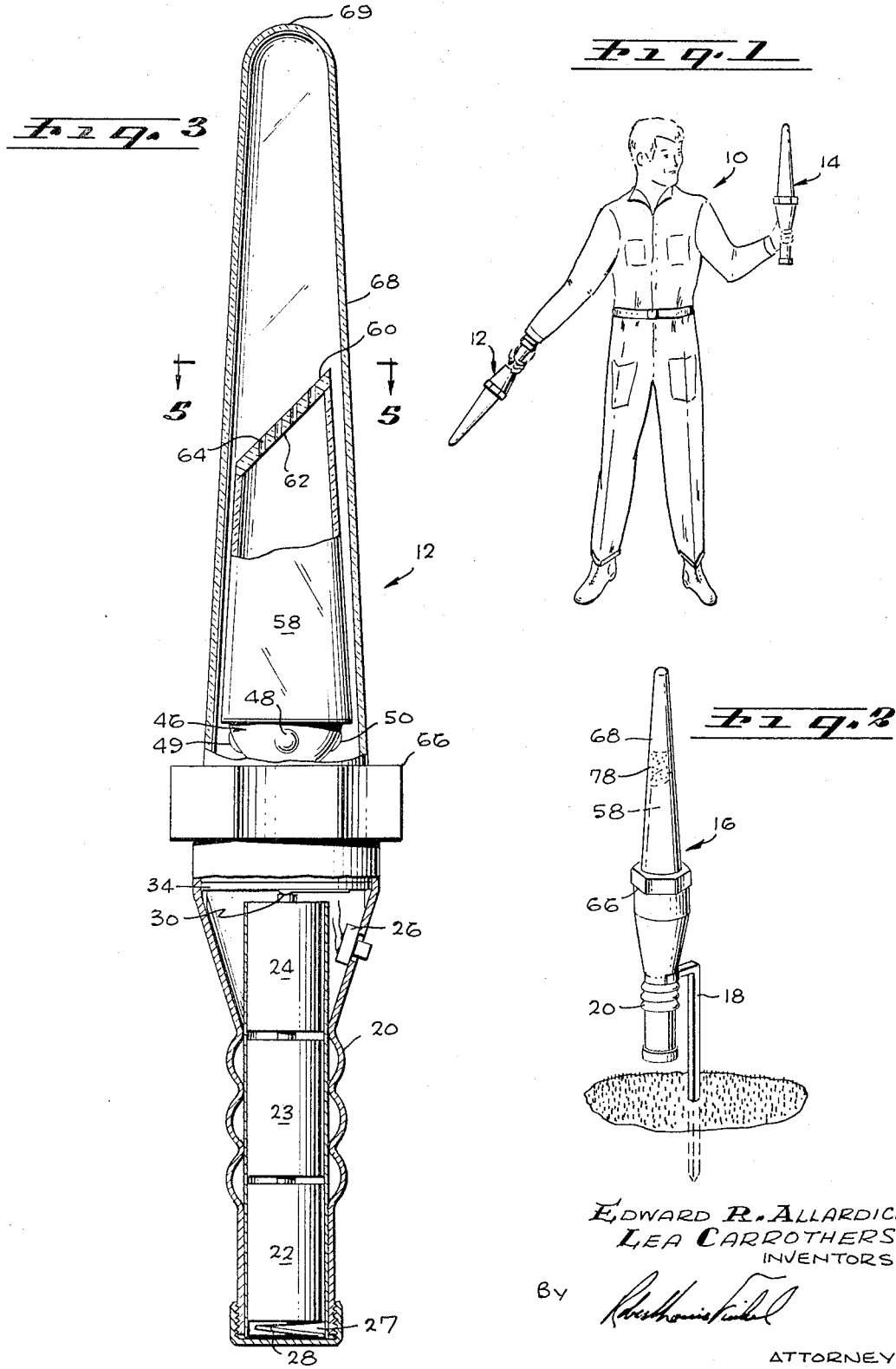

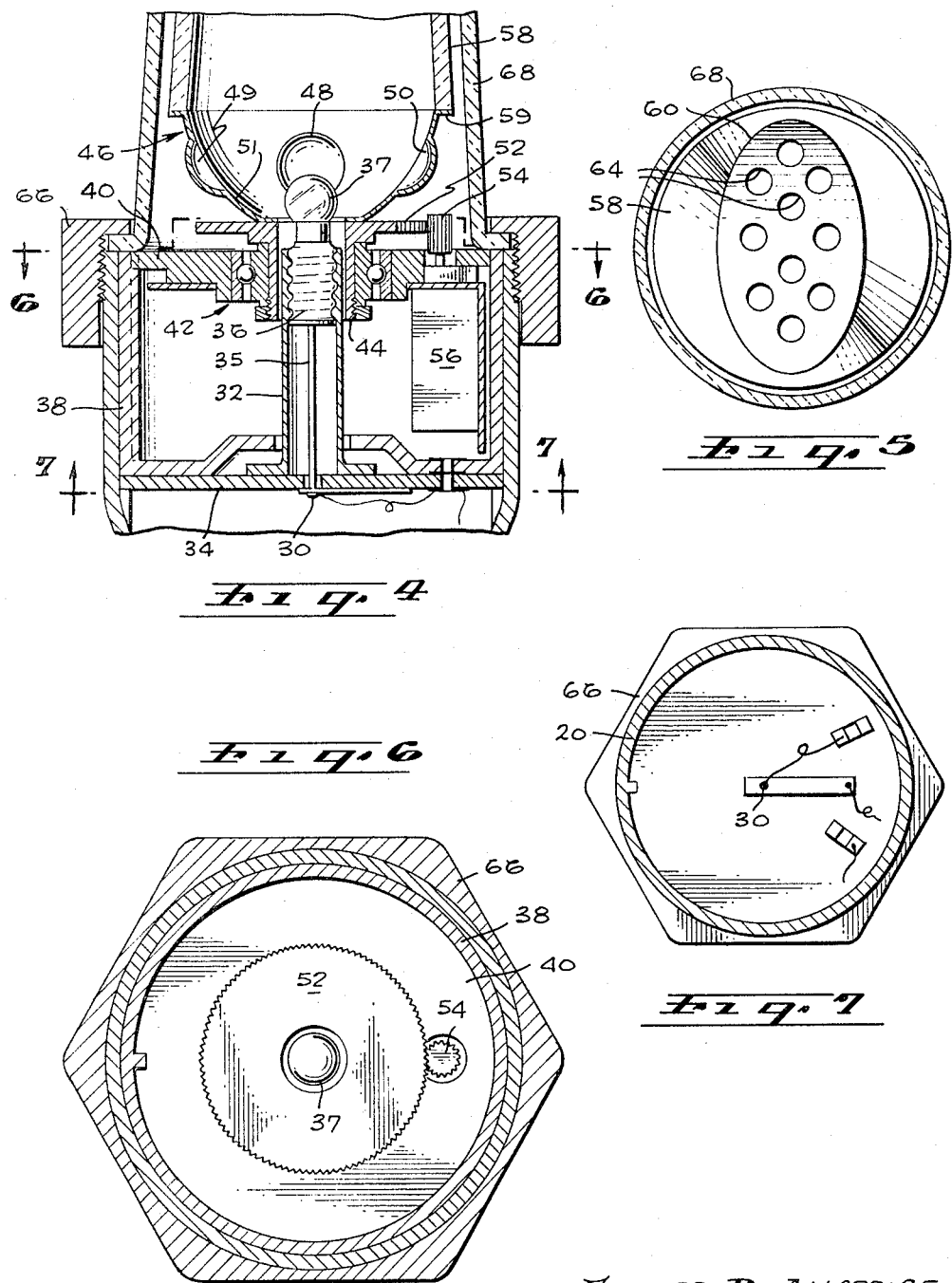

3,383,675
ROTATING BEACON WAND
Edward R. Allardice, Los Angeles, Calif. (20701 Vanowen, Canoga Park, Calif. 91306), and Lea Carrothers, Los Angeles, Calif. (1329 N. Old Topanga Road, Topanga, Calif. 90290)
Filed Aug. 20, 1965, Ser. No. 481,262
8 Claims. (Cl. 340—321)

ABSTRACT OF THE DISCLOSURE

A rotating beacon wand comprising an elongated light-transmitting casing, a light source, means directing light from the source into the casing along a path coinciding with the major axis of the casing, a rotatable reflector within the casing positioned in the light path to reflect a portion of the light transversely to the path, and means rotating the reflector about an axis coinciding with the light path.

---

This invention relates to signal lamps, and more particularly to illuminated wand-type signal lamps which are adapted to be held in the hand.

Both rotating beacons and hand held signal lamps have been in common use for many years. Both, however, are subject to a multitude of deficiencies and are of limited use for certain applications. The typical rotating beacon employs one or more lights mounted for rotation within a transparent or translucent envelope. These units are generally too large, cumbersome in shape, and heavy for use in hand signaling operations. On the other hand, although more conveniently carried by hand, the existing signal lamps, and particularly those having the appearance of an illuminated wand, are extremely difficult to locate and follow when observed from a distance against an illuminated background. This latter deficiency is particularly significant in airport ground control operations, such as directing the taxiing and parking of aircraft at night or in inclement weather, when hand signaling is the principal means used for communications.

It is an object of this invention to provide a signal light capable of being seen at a great distance at night or in conditions of poor visibility.

It is another object of this invention to provide such a light projecting a pulsing beacon capable of being hand carried.

Another object is to create a rotating beacon wand of simple yet durable construction.

Other and further objects will become apparent from the following description, taken in connection with the accompanying drawings in which:

FIGURE 1 is a view of a traffic signalman with a pair of signal lights of this invention in his hands;

FIGURE 2 is a view of a typical signal light of this invention mounted upon a stand;

FIGURE 3 is a view, partly in profile and partly in section, of one embodiment of the signal lamp of this invention;

FIGURE 4 is a sectional view of the drive mechanism and light used in this invention;

FIGURE 5 is a view taken at 5—5 in FIGURE 3;

FIGURE 6 is a view taken at 6—6 in FIGURE 4; and

FIGURE 7 is a view taken at 7—7 in FIGURE 4.

Typically a signalman 10 carries a pair of signal lamps 12 and 14 in his hands, as shown in FIGURE 1, to signal and direct aircraft in starting, taxiing and parking at night or when visibility is restricted.

Alternatively, a lamp 16 may be mounted upon a post or bracket 18. The bracket 18, depicted in FIGURE 2 by way of illustration only, shows how the signal lamp may be mounted adjacent an obstruction, at the scene of an accident, or in a similar situation as a warning signal. Note that while the support 18 is shown embedded in the ground, it may conveniently be provided with a self-supporting stand for placement on a highway or other relatively flat surface.

Referring to FIGURES 3 and 4, a handle 20 is adapted to receive several flashlight cells 22, 23, 24, and carries a three-position electrical switch 26. One end of the hollow handle is adapted to be opened at 27 to insert the cells. A spring 28 acts as a negative electrical contact and biases the cells into contact with the positive terminal 30.

A light mast 32 is supported, at one end of handle 20, by a bracket 34. A positive conductor 35 extends the length of the light mast 32 to a light socket 36 which is adapted to receive a light bulb 37.

A housing 38, having substantially cylindrical wall portions is inserted into the end of handle 20, adjacent to and surrounding the light mast 32. The housing 38 supports a bearing assembly having an outer shelf 40, a ball bearing set 42, and an inner collar 44. The inner collar 44 is preferably made of plastic for light weight and electrical insulation. The inner collar clears the light mast 32.

A light reflector 46 is supported upon the inner collar and is adapted to rotate with the inner collar. The light reflector 46 surrounds the light bulb 37 and is adapted to reflect the light from bulb 37. The concave light reflector 46 may, for example, be spherical, parabolic, or reasonable similar to those figures. In one preferred embodiment of the invention the reflector 46 is dimpled with concave secondary reflector 48, 49, 50, and a fourth dimple (not shown). The secondary reflectors 48, 49, 50 have substantially smaller radii of curvature than the primary reflector surface 51. The surfaces 48, 49, 50, like that of primary reflector 51, are preferably spherical, parabolic or reasonable approximations of those figures.

A gear 52 is mounted upon the outer periphery of collar 44 to receive driving torque. A second gear or pinion 54 meshes with gear 52 and is driven by an electric motor 56 which is mounted upon the interior of housing 38.

A light transmitting member 58, shaped generally in the form of a frustum of a right circular cone is mounted upon the outer rim 59 of light reflector 46. The member 58 may be transparent or translucent, depending on the particular use for which it is intended, and it may be colored red, yellow, green or some other hue in order to give a distinguishable signal.

Upon the outer end of the member 58 is a reflecting means 60 which is designed to reflect a portion of the light transversely to the axis of the conical member 58 and to transmit a portion of the light in the direction of the axis of the conical member 58 to illuminate the upper portion of the wand. One embodiment of the reflector means 60 is shown more particularly in FIGURES 3 and 5 in which the means 60 has a mirrored surface surface 62 and a plurality of perforations, one of which is shown at 64.

In an alternative embodiment of reflector means 60 (not shown), a partially silvered mirror without perforations is used.

Surrounding the rotating member 58, and attached to handle 20 by a retaining collar-nut 66, is a light transmitting cover 68. In the preferred embodiment, both the inner and outer surfaces of cover 68 are conically shaped with substantially the same apex angle as the apex angle of the conical member 58. Clearance is maintained between members 58 and 68 to allow member 58 to rotate. The end 69 of cover 68 is closed and conveniently is substantially spherical in shape.

The cover 68 may be either transparent or translucent at the convenience of the user and may be made in any desired color. For some applications the region 78 of cover 68 adjacent the reflector means 60 may be clear or of a different color from the remainder of cover 68, to give a distinctive appearance to the reflected rotating beacon.

In operation, when switch 26 is moved to its first position lamp 37 is lit, illuminating cover 68 and projecting a powerful beam by reflection from reflecting means 60. Moved to its second position switch 26 lights lamp 37 and starts motor 56. Motor 56 rotates gear 52, reflector 46, member 58, and reflecting means 60. Light is projected from surface 51 and from the dimple reflectors 48, 49, 50, and others, toward reflecting means 60. A portion of the light penetrates the walls of members 58 and 68 between reflector 46 and reflecting means 60. A major portion of the light is reflected by mirrored surface 62 in the region of reflecting means 60, and a portion of the light is transmitted through perforations 64 and the wall of member 68. It is to be noted that the walls of members 58 and 68 are usually not perfect light transmitters, and thus a portion of the light is reflected from their inner walls and becomes diffused, making the entire wand easily visible at a great distance. In position three the current to both the lamp 37 and the motor 56 is interrupted and the wand may be stored without continued drain on the batteries.

To the observer, the illuminated rotating beacon wand appears as a line of light with a strong recurrent flash in its central region.

It has been observed that the flashing beacon and distinctive color of the signal lamps, permit an aircraft pilot to quickly locate and follow them on his approach to the parking area of any airport, even if he is a stranger to the airport. It is obvious, however, that while the rotating beacon wand is particularly suited for such use, it is readily adapted to be used in connection with automobile traffic controlling, rescue work, stationary boundary marking, and many other situations.

Although the rotating beacon wand has been described in its preferred detail above, it is not intended that the invention be limited to the particular form illustrated, but only in accordance with the appended claims.

What is claimed is:

1. A rotating beacon wand comprising:
    a handle;
    an electric light source on one end of said handle;
    a reflector for said light source reflecting the light from said light source in substantially one direction away from said handle;
    a substantially conical light transmitting member, attached to said reflector and tapering from said reflector in said one direction, said light transmitting member being substantially shaped as a frustum of a right circular cone;
    rotatable reflecting means, upon the end of said light transmitting member, tilted to reflect at least a portion of said light transversely to said one direction;
    electric motor means, mechanically coupled to rotate at least said rotatable reflecting means; and
    a conically shaped light transmitting cover, having the axis of its cone substantially coaxial with the axis of said first mentioned light transmitting member.

2. A device as recited in claim 1 in which said rotatable reflecting means is a partially reflecting mirror.

3. A device as recited in claim 1 in which said reflector for said light source is provided with at least one reflecting dimple surface.

4. A rotating beacon wand comprising:
    a handle;
    an electric light source on one end of said handle;
    a reflector for said light source reflecting the light from said light source in substantially one direction away from said handle;
    a substantially conical light transmitting member attached to said reflector and tapering from said reflector in said one direction, said light transmitting member being substantially shaped as a frustum of a right circular cone;
    a rotatable mirror on the end of said light transmitting member, having light transmitting perforations formed therethrough, and tilted at an angle to the axis of said light transmitting member to reflect at least a portion of said light transversely to said one direction;
    electric motor means mechanically coupled to rotate at least said mirror; and
    a conically shaped light transmitting cover having the axis of its cone substantially coaxial with the axis of said first mentioned light transmitting member.

5. A device as recited in claim 4 in which said mirror is fixed to the end of said light transmitting member, and said electric motor means rotate said light transmitting member.

6. A rotating beacon wand comprising:
    a handle;
    a light source in said handle;
    a first reflector reflecting light from said source in a direction away from said handle;
    a light transmitting member attached to said first reflector and extending therefrom in said direction;
    a second substantially planar reflector mounted on the end of said light transmitting member to reflect a portion of said light transversely to said one direction;
    powered means rotating said light transmitting member;
    a tapered light transmitting cover enclosing said light transmitting member attached to said handle and extending therefrom beyond said second reflector.

7. A device as recited in claim 6 in which said second reflector is a partially reflecting mirror.

8. A device as recited in claim 6 in which said second reflector is a mirror having a plurality of light transmitting openings therethrough, whose plane is tilted at an angle with respect to said direction.

References Cited

UNITED STATES PATENTS

| | | | |
|---|---|---|---|
| 543,730 | 7/1895 | Heap | 340—25 |
| 738,781 | 9/1903 | Edwards | 340—50 |
| 1,961,116 | 5/1934 | Van Vloten | 340—25 |
| 2,092,664 | 9/1937 | Bray | 340—321 |

THOMAS A. ROBINSON, *Primary Examiner.*